US010341638B2

(12) United States Patent
Lin et al.

(10) Patent No.: US 10,341,638 B2
(45) Date of Patent: Jul. 2, 2019

(54) METHOD AND APPARATUS OF DEPTH TO DISPARITY VECTOR CONVERSION FOR THREE-DIMENSIONAL VIDEO CODING

(71) Applicant: MediaTek Inc., Hsin-Chu (TW)

(72) Inventors: Jian-Liang Lin, Su'ao Township Yilan County (TW); Yi-Wen Chen, Taichung (TW)

(73) Assignee: MediaTek Inc., Hsin-Chu (TW)

( * ) Notice: Subject to any disclaimer, the term of this patent is extended or adjusted under 35 U.S.C. 154(b) by 462 days.

(21) Appl. No.: 14/758,413

(22) PCT Filed: Jan. 7, 2014

(86) PCT No.: PCT/CN2014/070237
§ 371 (c)(1),
(2) Date: Jun. 29, 2015

(87) PCT Pub. No.: WO2014/106496
PCT Pub. Date: Jul. 10, 2014

(65) Prior Publication Data
US 2015/0358598 A1 Dec. 10, 2015

Related U.S. Application Data

(60) Provisional application No. 61/749,455, filed on Jan. 7, 2013.

(51) Int. Cl.
*H04N 19/176* (2014.01)
*H04N 13/161* (2018.01)
(Continued)

(52) U.S. Cl.
CPC ......... *H04N 13/161* (2018.05); *H04N 19/105* (2014.11); *H04N 19/52* (2014.11); *H04N 19/597* (2014.11)

(58) Field of Classification Search
CPC ............ H04N 13/105; H04N 13/0048; H04N 19/105; H04N 19/52; H04N 19/597; H04N 19/00
See application file for complete search history.

(56) References Cited

U.S. PATENT DOCUMENTS 8,532,410 B2 * 9/2013 Tian ..................... H04N 19/597
382/232
9,402,066 B2 * 7/2016 Jeong .................. H04N 19/597
(Continued)

FOREIGN PATENT DOCUMENTS

| CN | 101222639 | 7/2008 |
| CN | 101616322 | 12/2009 |
| CN | 102017627 | 4/2011 |

OTHER PUBLICATIONS

Bang, G., et al.; "3D-CE5.a related—Simplification on the disparity vector derivation;" Joint Collaborative Team on 3D Video Coding Extension Development of ITU-T SG 16 WP 3 and ISO/IEC JTC 1/SC 29/WG 11; Oct. 2012; pp. 1-6.
(Continued)

*Primary Examiner* — Behrooz M Senfi
(74) *Attorney, Agent, or Firm* — Wolf, Greenfield & Sacks, P.C.

(57) ABSTRACT

A method and apparatus using a single converted DV (disparity vector) from the depth data for a conversion region are disclosed. Embodiments according to the present invention receive input data and depth data associated with a conversion region of a current picture in a current dependent view. The conversion region is checked to determine whether it is partitioned into multiple motion prediction sub-blocks. If the conversion region is partitioned into multiple motion prediction sub-blocks, then a single converted DV from the depth data associated with the conversion region is determined and each of the multiple motion
(Continued)

prediction sub-blocks of the conversion region is processed according to a first coding tool using the single converted DV. If the conversion region is not partitioned into multiple motion prediction sub-blocks, the conversion region is processed according to the first coding tool or a second coding tool using the single converted DV.

15 Claims, 6 Drawing Sheets

(51) Int. Cl.
*H04N 19/105* (2014.01)
*H04N 19/597* (2014.01)
*H04N 19/52* (2014.01)

(56) References Cited

U.S. PATENT DOCUMENTS

| | | | | |
|---|---|---|---|---|
| 9,516,306 | B2* | 12/2016 | Zhang | H04N 19/597 |
| 9,843,820 | B2* | 12/2017 | Lin | H04N 19/597 |
| 9,894,377 | B2* | 2/2018 | Park | H04N 19/513 |
| 2007/0291850 | A1 | 12/2007 | Ishikawa et al. | |
| 2011/0044550 | A1* | 2/2011 | Tian | H04N 19/597 |
| | | | | 382/238 |
| 2011/0286678 | A1* | 11/2011 | Shimizu | H04N 19/80 |
| | | | | 382/233 |
| 2014/0169474 | A1* | 6/2014 | Kang | H04N 13/0022 |
| | | | | 375/240.16 |
| 2014/0192154 | A1* | 7/2014 | Jeong | H04N 19/597 |
| | | | | 348/43 |
| 2014/0341292 | A1* | 11/2014 | Schwarz | H04N 19/597 |
| | | | | 375/240.16 |
| 2015/0201214 | A1* | 7/2015 | Lin | H04N 19/597 |
| | | | | 348/42 |
| 2015/0208086 | A1* | 7/2015 | Chen | H04N 19/597 |
| | | | | 375/240.17 |
| 2015/0245049 | A1* | 8/2015 | Lee | H04N 19/597 |
| | | | | 375/240.16 |

OTHER PUBLICATIONS

Lin, J.L., et al.; "3D-CE5.a results on unification of the depth to DV conversion;" Joint Collaborative Team on 3D Video Coding Extension Development of ITU-T SG 16 WP 3 and ISO/IEC JTC 1/SC 29/WG 11; Oct. 2012; pp. 1-4.

Yea, S., et al.; "CE5 Summary Report—Motion mode Parameter Prediction;" Joint Collaborative Team on 3D Video Coding Extension Development of ITU-T SG 16 WP 3 and ISO/IEC JTC 1/SC 29/WG 11; Oct. 2012; pp. 1-15.

Lin, J.L., et al.; "3D-CE5. a related Simplification on the disparity vector derivation for AVC-based 3D video coding;" Joint Collaborative Team on 3D Video Coding Extension Development of ITU-T SG 16 WP 3 and ISO/IEC JTC 1/SC 29/WG 11; pp. 1-6.

Lin, J.L., et al.; "3D-CE5. h related Simplification on the disparity vector derivation for HEVC-based 3D video coding;" Joint Collaborative Team on 3D Video Coding Extension Development of ITU-T SG 16 WP 3 and ISO/IEC JTC 1/SC 29/WG 11; pp. 1-5.

International Search Report dated Apr. 16, 2014, issued in PCT Application No. PCT/CN2014/070237.

* cited by examiner

METHOD AND APPARATUS OF DEPTH TO DISPARITY VECTOR CONVERSION FOR THREE-DIMENSIONAL VIDEO CODING

CROSS REFERENCE TO RELATED APPLICATIONS

The present invention is a National Phase Application of PCT Application No. PCT/CN2014/070237, filed on Jan. 7, 2014, which claims priority to U.S. Provisional Patent Application, Ser. No. 61/749,455, filed on Jan. 7, 2013, entitled "Methods and Apparatus for Disparity Vector Derivation in Multiview Video Coding". The U.S. Provisional Patent Application is hereby incorporated by reference in its entirety.

TECHNICAL FIELD

The present invention relates to video coding. In particular, the present invention relates to disparity vector derivation from depth for three-dimensional video coding.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

The MVC adopts both temporal and spatial predictions to improve compression efficiency. During the development of MVC, some macroblock-level coding tools are proposed, including illumination compensation, adaptive reference filtering, motion skip mode, and view synthesis prediction. These coding tools are proposed to exploit the redundancy between multiple views. Illumination compensation is intended for compensating the illumination variations between different views. Adaptive reference filtering is intended to reduce the variations due to focus mismatch among the cameras. Motion skip mode allows the motion vectors in the current view to be inferred from the other views. View synthesis prediction is applied to predict a picture of the current view from other views.

In the reference software for HEVC based 3D video coding (3D-HTM), inter-view candidate is added as a motion vector (MV) or disparity vector (DV) candidate for Inter, Merge and Skip mode in order to re-use previously coded motion information of adjacent views. In 3D-HTM, the basic unit for compression, termed as coding unit (CU), is a 2N×2N square block. Each CU can be recursively split into four smaller CUs until a predefined minimum size is reached. Each CU contains one or more prediction units (PUs).

To share the previously coded texture information of adjacent views, a technique known as Disparity-Compensated Prediction (DCP) has been included in 3D-HTM as an alternative coding tool to motion-compensated prediction (MCP). MCP refers to an inter-picture prediction that uses previously coded pictures of the same view, while DCP refers to an inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures. In 3D-HTM, when deriving an inter-view Merge candidate for Merge/Skip modes, if the motion information of corresponding block is not available or not valid, the inter-view Merge candidate is replaced by a DV.

In Inter mode, Direction-Separate Motion Vector Prediction is another coding tool used in 3D-AVC. The direction-separate motion vector prediction consists of the temporal and inter-view motion vector prediction. If the target reference picture is a temporal prediction picture, the temporal motion vectors of the adjacent blocks around the current block Cb, such as A, B, and C in FIG. 2A are employed in the derivation of the motion vector prediction. If a temporal motion vector is unavailable, an inter-view motion vector is used. The inter-view motion vector is derived from the corresponding block indicated by a DV converted from depth. The motion vector prediction is then derived as the median of the motion vectors of the adjacent blocks A, B, and C. Block D is used only when C is unavailable.

On the contrary, if the target reference picture is an inter-view prediction picture, the inter-view motion vectors of the neighboring blocks are employed for the inter-view prediction. If an inter-view motion vector is unavailable, a disparity vector which is derived from the maximum depth value of four corner depth samples within the associated depth block is used. The motion vector predictor is then derived as the median of the inter-view motion vector of the adjacent blocks A, B, and C.

On the other hand, if the target reference picture is an inter-view prediction picture, the inter-view motion vectors of the neighboring blocks are used to derive the inter-view motion vector predictor as shown in FIG. 2B. Inter-view motion vectors of the spatially neighboring blocks are derived based on the texture data of respective blocks in step 210. The depth map associated with the current block Cb is also provided in step 260. The availability of inter-view motion vector for blocks A, B and C is checked in step 220. If an inter-view motion vector is unavailable, the disparity vector for the current block is used to replace the unavailable inter-view motion vector as shown in step 230. The disparity vector is derived from the maximum depth value of the associated depth block (280) as shown in step 270. The median of the inter-view motion vectors of blocks A, B and C is used as the inter-view motion vector predictor. The conventional MVP procedure is shown in step 240, where a final MVP is derived based on the median of the motion vectors of the inter-view MVPs or temporal MVPs. Motion vector coding based on the motion vector predictor is performed as shown in step 250.

Priority based MVP candidate derivation for Skip/Direct mode is another coding tool for 3D-AVC. In Skip/Direct mode, a MVP candidate is derived based on predefined derivation order: inter-view candidate and the median of three spatial candidates derived from the neighboring blocks A, B, and C (D is used only when C is unavailable) as shown in FIG. 3. On the decoder side, the motion compensation is performed according to the motion information of that derived MVP candidate. The motion information includes the prediction direction (uni-direction prediction or bi-direction prediction), the reference picture type (temporal prediction, virtual prediction, or inter-view prediction), and the reference picture index. As shown in FIG. 3, the central point (312) of the current block (310) in the dependent view and its disparity vector are used to find the corresponding point in the base view or reference view. After that, the MV of the block including the corresponding point in the base view is used as the inter-view candidate of the current block. The disparity vector can be derived from both the neighboring blocks (A, B and C/D) and the depth value of the central point in ATM 7.0. Specifically, if only one of the neighboring blocks has disparity vector (DV), the DV is used as the disparity. Otherwise, the DV is derived as the median of the DVs (320) of the adjacent blocks A, B, and C. If a DV is unavailable, a DV converted from depth (350) is then used instead. The derived DV is used to locate a corresponding block (340) in the reference picture (330).

In 3D-AVC, during the inter-view MVP derivation process for Skip/Direct mode, the disparity vector (DV) is derived from depth information of a corresponding block when the DV for a candidate neighboring block is not available. The depth-to-DV conversion for Skip/Direct mode in 3D-AVC is shown in FIG. 4, where the DV is determined based on the maximum depth values of the depth sample at four corners (shown in high-lighted small squares) of the associated depth block (a Macroblock, MB in this example). Therefore, the depth-to-DV conversion only needs to be performed once for each MB.

The depth-to-DV conversion to derive a DV for unavailable neighboring blocks in Inter mode is shown in FIG. 5, where the depth-to-DV conversion is performed multiple times for various partitions for the MB. For example, if the current MB is partitioned into 16 4×4 sub-blocks, the depth-to-DV conversion is performed 16 times. For each sub-block, the DV is determined based on the maximum depth values of the depth sample at four corners of the associated depth sub-block.

In 3D-HEVC, inter-view residual prediction (IVRP) has been developed as a new coding tool in order to share the previously encoded residual information of reference views. The inter-view residual prediction is based on a Disparity Vector (DV) derived for the current block (i.e., Prediction Unit, PU). The DV can be derived from the spatial or temporal neighboring blocks of the current block according to 3D-HEVC. Alternatively, a disparity derivation technique based on Motion Compensated Prediction (MCP), named DV-MCP, can also be used to derive an estimated DV. In this case, blocks coded by MCP are also used for the disparity derivation process. When a neighboring block is an MCP coded block and its motion is predicted by interview motion prediction, the disparity vector used for the inter-view motion prediction represents a motion correspondence between the current block and the inter-view reference picture. The block is referred to as a DV-MCP block.

As discussed above, the DV is widely used in three-dimensional coding for various applications. One method to derive the DV is based on depth map. Different depth-to-disparity conversions are being used in the three-dimensional coding standard, such as 3D-HEVC. It is desirable to simplify the depth-to-disparity conversion process while maintaining the performance.

SUMMARY

A method and apparatus for three-dimensional or multi-view video coding are disclosed. Embodiments according to the present invention receive input data and depth data associated with a conversion region of a current picture in a current dependent view. The conversion region is checked to determine whether it is partitioned into multiple motion prediction sub-blocks. If the conversion region is partitioned into multiple motion prediction sub-blocks, then a single converted DV (disparity vector) from the depth data associated with the conversion region is determined and each of the multiple motion prediction sub-blocks of the conversion region is processed according to a first coding tool using the single converted DV. If the conversion region is not partitioned into multiple motion prediction sub-blocks, the conversion region is processed according to the first coding tool or a second coding tool using the single converted DV. In one embodiment, the first coding tool corresponds to motion vector prediction (MVP) in Inter mode and the second coding tool corresponds to MVP in Skip or Direct mode. In this case, the conversion region may correspond to a 16×16 macroblock (MB). In another embodiment, the first coding tool corresponds to motion vector prediction (MVP) in Inter or Merge mode and the second coding tool corresponds to MVP in Skip mode. In this case, the conversion region may correspond to a Coding Unit (CU), a Largest CU (LCU), a Coding Tree Unit (CTU), or a Motion Estimation Region (MER), and wherein the motion prediction sub-block corresponds to a Prediction Unit (PU).

One aspect of the present invention addresses the derivation of the single converted DV. In one embodiment, the single converted DV is determined from a maximum depth value of at least two samples in a depth block associated with the conversion region. In another embodiment, the single converted DV is determined from the maximum depth value of four corner samples in the depth block associated with the conversion region.

The first coding tool can be selected from a first tool set and the second coding tool can be selected from a second tool set. The first tool set consists of one or more first tool elements from a coding tool group and the second tool set consists of one or more second tool elements from the coding tool group. The coding tool group may comprise motion vector prediction (MVP) candidate derivation in Inter mode, MVP candidate derivation in Skip mode, MVP candidate derivation in Direct mode, direction-separated motion vector predictor, priority based MVP candidate derivation in the Skip mode or the Direct mode, inter-view candidate derivation in Merge mode, the inter-view candidate derivation in the Skip mode, inter-view motion prediction, inter-view disparity prediction, block-based view synthesis prediction, and inter-view residual prediction. In one embodiment, the first tool set and the second tool set have at least one common coding tool, and wherein the first tool set and the second tool set have at least one different coding tool. In another embodiment, the first tool set and the second tool set have same coding tools.

DETAILED DESCRIPTION

In the present invention, a method to derive the disparity vector from an associated depth block in the multi-view and 3D video coding is disclosed. The DV derivation method can be used in the priority based MVP candidate derivation for the Skip and Direct mode, the inter-view motion vector predictor derivation in direction-separate motion vector prediction, or the view synthesis prediction (VSP). Moreover, the depth-to-DV scheme according to the present invention can also be applied to other cases where there is a need to derive a DV to determine location of the data in the other views and to access the data or to be used as a predictor.

Figure 1:
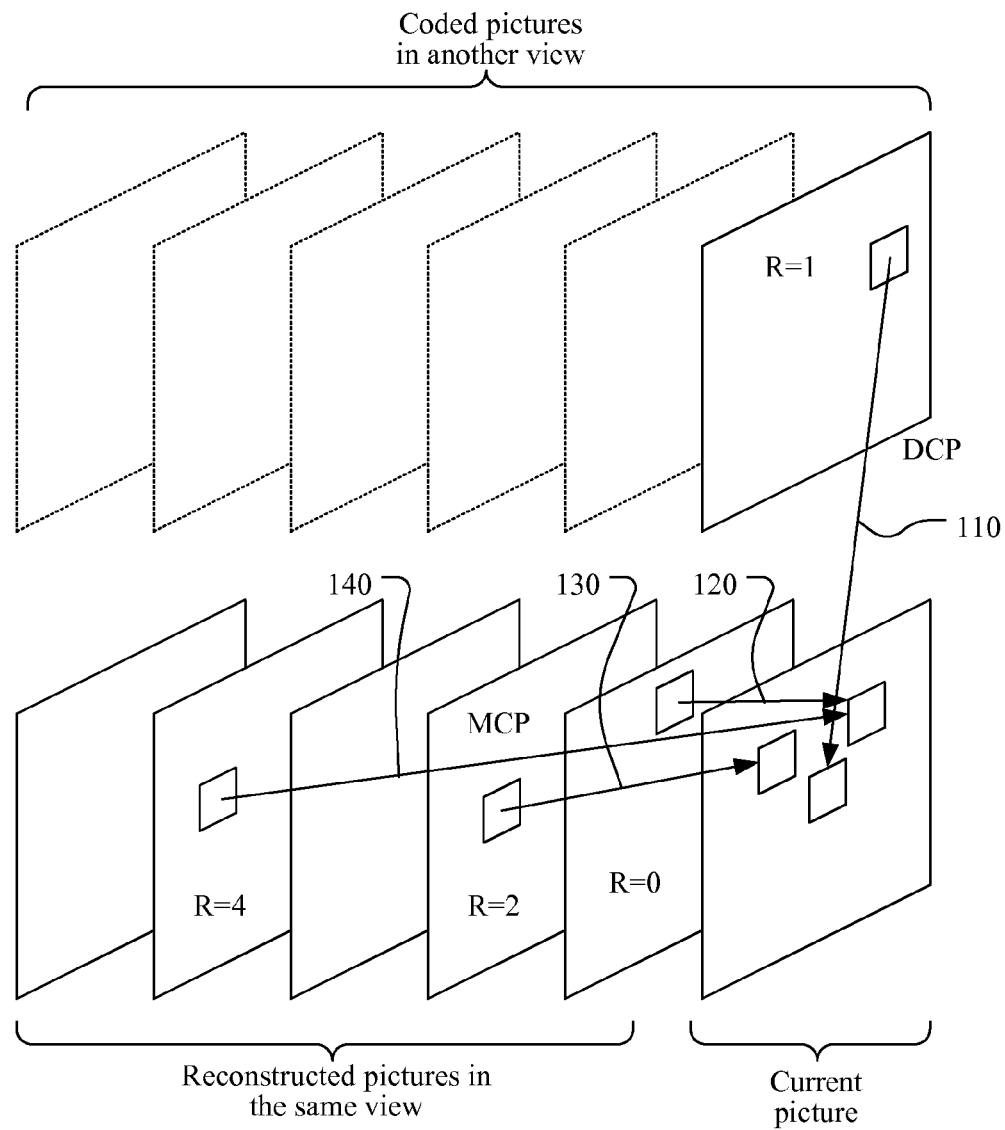
FIG. 1 illustrates an example of three-dimensional video coding system incorporating motion compensated prediction (MCP) and disparity compensated prediction (DCP).
Figure 2A:
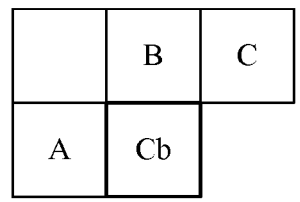
FIG. 2A illustrates the neighboring blocks around the current block (Cb) used for the derivation of motion vector prediction in 3D-AVC (three-dimensional video coding based on Advanced Video Coding (AVC)).
Figure 2B:
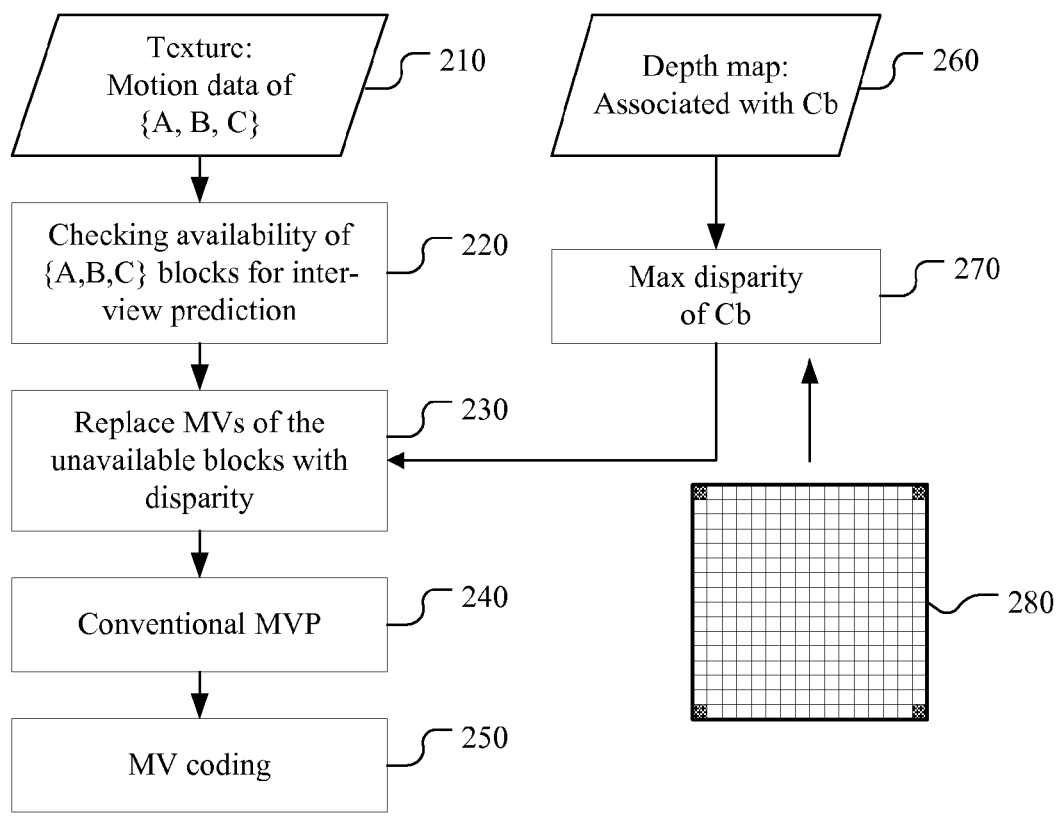
FIG. 2B illustrates the derivation process of direction-separated motion vector prediction for Inter mode in 3D-AVC.
Figure 3:
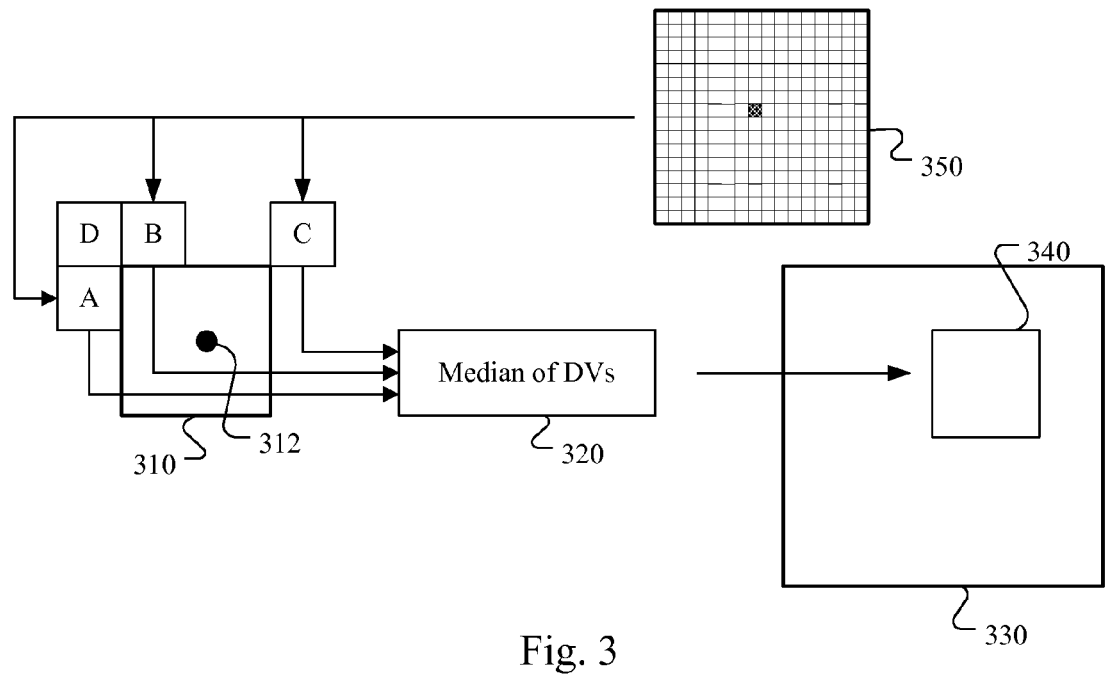
FIG. 3 illustrates the priority based MVP candidate derivation process for Skip/Direct mode in 3D-AVC.
Figure 4:
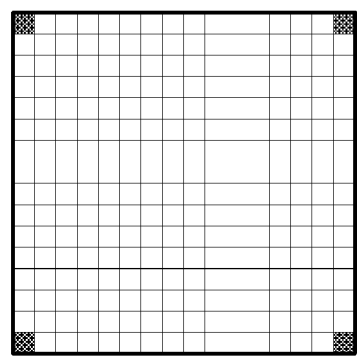
FIG. 4 illustrates the depth-to-DV conversion based on the depth samples at four corners of a depth block for Skip/Direct mode in 3D-AVC.
Figure 5:
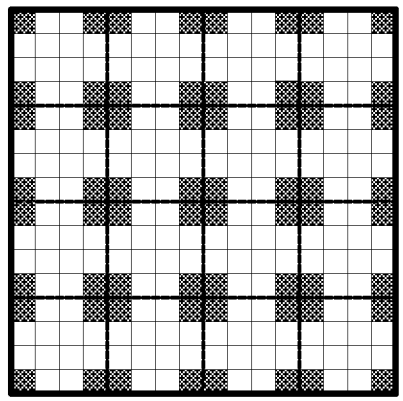
FIG. 5 illustrates the depth-to-DV conversion for each sub-block of a macroblock (MB) for Inter mode in 3D-AVC.
Figure 6:
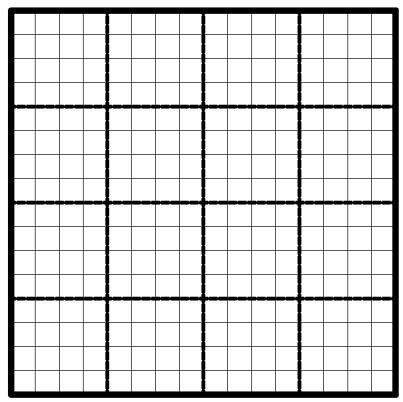
FIG. 6 illustrates an exemplary depth-to-DV conversion region and the multiple motion prediction sub-blocks according to embodiments of the present invention.

For convenience, the depth-to-DV conversion region is defined as a square block. A picture can be divided into depth-to-DV conversion regions. An exemplary depth-to-DV conversion region is illustrated in FIG. 6. The conversion region can be a macroblock (MB) in AVC/H.264, or a largest coding unit (LCU), a coding tree unit (CTU), a coding unit (CU), or a motion estimation region (MER) in the HEVC standard. The conversion region can be further divided into multiple motion prediction sub-blocks as indicated by the dashed lines. For example, in the AVC/H.264, a macroblock (a conversion region) can be further divided into multiple motion prediction sub-blocks based on the partition type. Also in the HEVC standard, a CU (a conversion region) can be further divided into multiple prediction units (PUs), which are considered as motion prediction sub-blocks. The associated depth block may have the same resolution as the corresponding texture block. The associated depth block may also have a lower resolution than the corresponding texture block.

Figure 7A:
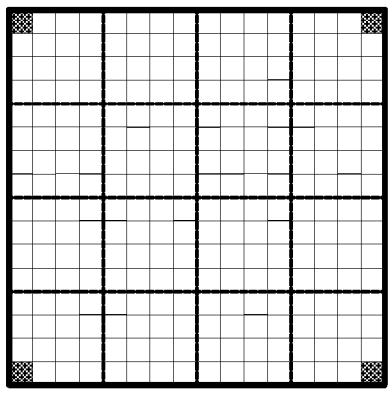
FIG. 7A-FIG. 7F illustrate various examples of depth-to-DV conversion based on one or more depth sample of a depth block.
Figure 7B:
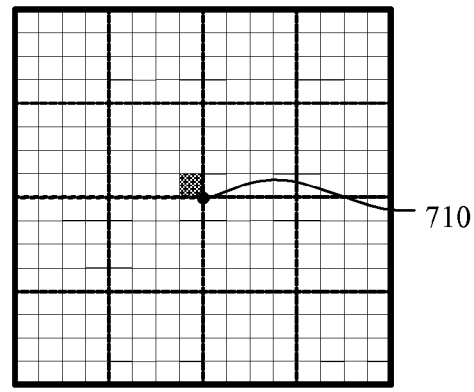
Figure 7C:
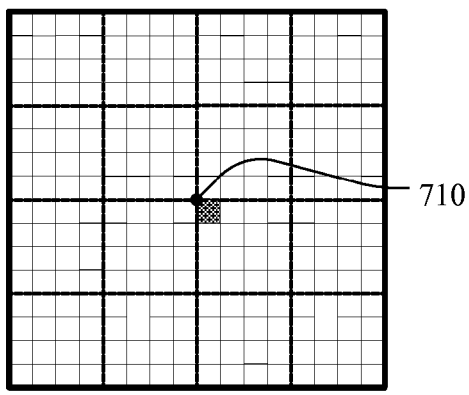
Figure 7D:
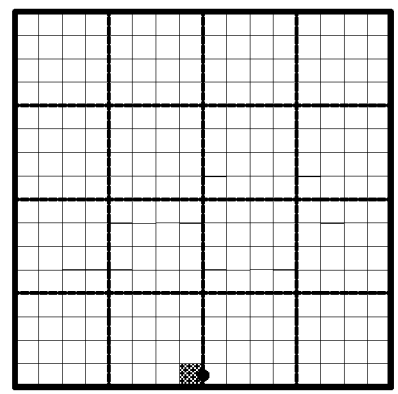
Figure 7E:
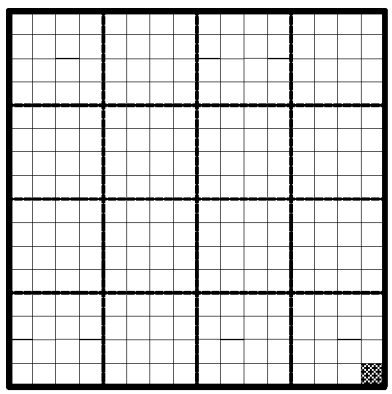
Figure 7F:
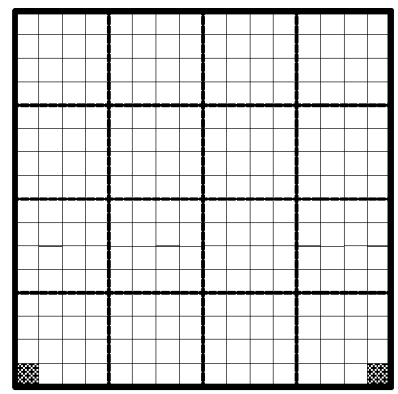

In order to simplify and/or unify the depth-to-DV conversion process, embodiments according to the present invention forces all motion prediction sub-blocks in a conversion region to use a same DV derived from the associated depth block (for each prediction direction). For example, if the depth-to-DV conversion region is a 16×16 macroblock, each sub-block within a MB uses the same DV derived from the depth samples in the depth block associated with the MB. The depth-to-DV conversion may be based on the maximum depth values at four corners of the depth block as shown in FIG. 7A. The derived DV is then used by all sub-blocks within the MB. While the example in FIG. 7A uses four corner samples to derive the DV, other depth-to-DV conversion may also be used. For example, the upper-left (FIG. 7B) or lower-right sample (FIG. 7C) of the block center (710), the left sample (FIG. 7D) of the center of the bottom row, the right-most sample (FIG. 7E) of the bottom row, or the two end samples (FIG. 7F) of the bottom row. The single disparity vector for all sub-blocks in the conversion region to share may also be derived from a maximum depth value of a subset of samples from the associated depth block of a conversion region.

In one embodiment of the present invention, a constraint of the DV derivation is applied to the priority based MVP candidate derivation for the Skip and Direct modes and the direction-separate motion vector prediction and/or the view synthesis prediction. According to this embodiment, the depth-to DV conversion region and associated depth samples for DV derivation are unified for the Skip/Direct mode and the direction-separate motion vector prediction. Furthermore, the depth-to-DV conversion is unified for all the coding tools in 3D video coding according to another embodiment of the present invention so that the overhead to derive DV can be further reduced.

Figure 8:
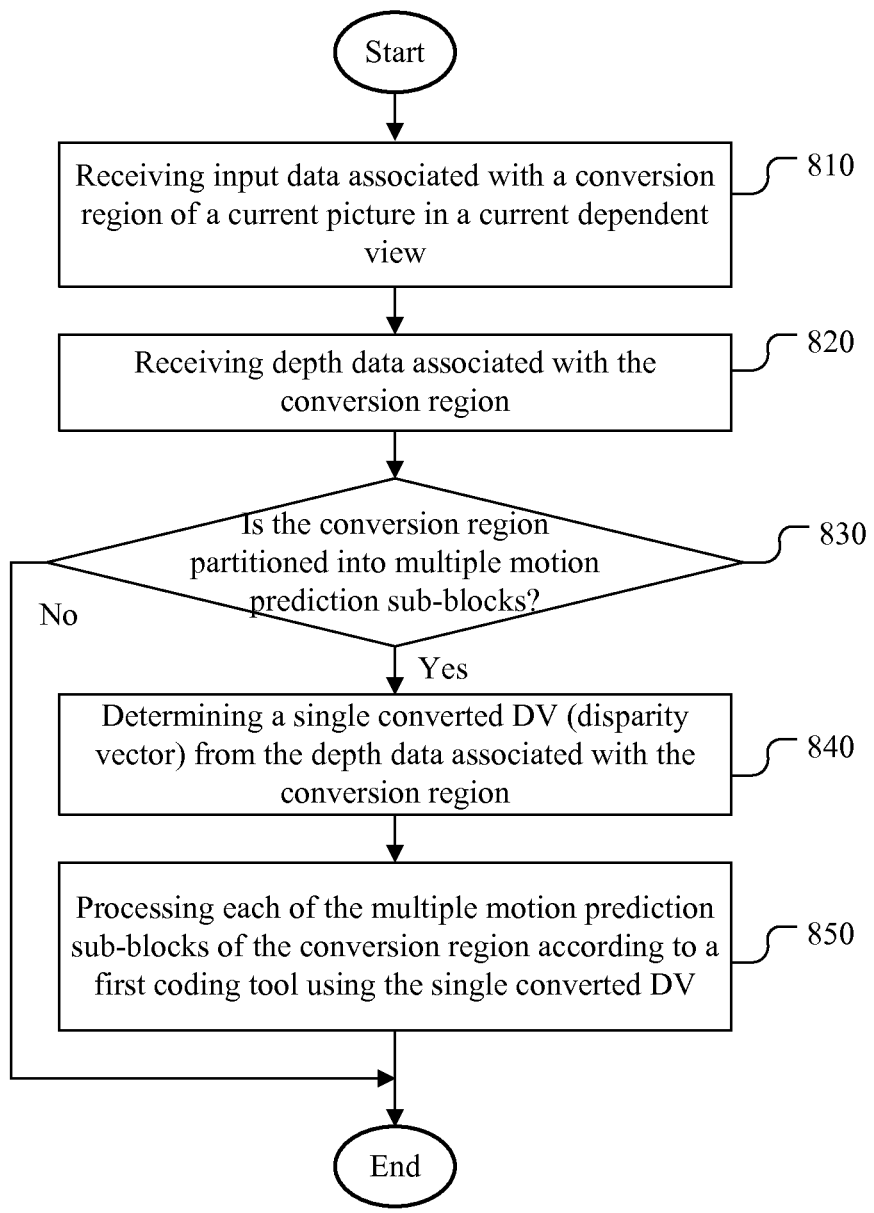
FIG. 8 illustrates an exemplary flowchart of three-dimensional or multi-view video coding incorporating a single converted disparity vector (DV) for a conversion region according to embodiments of the present invention.

FIG. 8 illustrates an exemplary flowchart of three-dimensional or multi-view video coding incorporating a single converted disparity vector (DV) for a conversion region according to embodiments of the present invention. The system receives input data associated with a conversion region of a current picture in a current dependent view as shown in step 810. For encoding, the input data associated with the conversion region corresponds to original pixel data or other information associated with the conversion region (e.g., residual data, motion vector, disparity vector, motion vector difference, or disparity vector difference) to be coded. For decoding, the input data corresponds to the coded data associated with the conversion region of the current picture in the dependent view. The input data may be retrieved from storage such as a computer memory, buffer (RAM or DRAM) or other media. The input data may also be received from a processor such as a controller, a central processing unit, a digital signal processor or electronic circuits that produce the input data. Depth data associated with the conversion region is received as shown in step 820. A test regarding whether the conversion region is partitioned into multiple motion prediction sub-blocks is performed in step 830. If the conversion region is partitioned into multiple motion prediction sub-blocks, a single converted DV (disparity vector) is determined from the depth data associated with the conversion region as shown step 840, and each of the multiple motion prediction sub-blocks of the conversion region is processed according to a first coding tool using the single converted DV as shown in step 850.

In some embodiments, if the test result of step 830 is negative as the conversion region is not partitioned into multiple motion prediction sub-blocks, the conversion region is processed according to the first coding tool or a second coding tool using the single converted DV. The first coding tool may correspond to motion vector prediction (MVP) in Inter mode and the second coding tool may correspond to MVP in Skip or Direct mode for three-dimensional coding system based on AVC (3D-AVC). In this case, the conversion region is typically a 16×16 macroblock (MB). The first coding tool may correspond to MVP in Inter or Merge mode and the second coding tool may correspond to MVP in Skip mode for three-dimensional coding system based on HEVC (3D-HEVC). In this case, the conversion region can be a Coding Unit (CU), a Largest CU (LCU), a Coding Tree Unit (CTU), or a Motion Estimation Region (MER), and the motion prediction sub-block corresponds to a Prediction Unit (PU).

The flowchart shown above is intended to illustrate an example of three-dimensional or multi-view video coding using a single converted DV (disparity vector) for a conversion region of a current picture in a current dependent view. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

A three-dimensional video coding system incorporating an embodiment of the present invention is compared to an anchor system corresponding to a conventional three-dimensional coding system based on AVC (3D-AVC). The system incorporating an embodiment of the present invention always uses a single converted disparity vector for the conversion region. On the other hand, the depth-to-DV conversion for Skip/Direct mode according to 3D-AVC is based on the depth samples at four corners of a depth block. The depth-to-DV conversion is performed for each sub-block of a macroblock (MB) when the MB is coded in Inter mode according to 3D-AVC. As shown in Table 1, an embodiment of the present invention achieves about the same performance as the 3D-AVC anchor system, i.e., no performance loss due to simplified depth-to-DV conversion. The performance is measured in terms of difference in bit rate (dBR, %) and difference in peak signal-to-noise ratio (dPSNR, dB).

TABLE 1

| | Texture coding | | Depth coding | | Total (coded PSNR) | | Total (synth. PSNR) | |
|---|---|---|---|---|---|---|---|---|
| | dBR, % | dPSNR, dB | dBR, % | dPSNR, dB | dBR, % | dPSNR, dB | dBR, % | dPSNR, dB |
| S01 | 0.00 | 0.00 | 0.00 | 0.00 | 0.00 | 0.00 | 0.01 | 0.00 |
| S02 | 0.02 | 0.00 | 0.00 | 0.00 | 0.02 | 0.00 | 0.02 | 0.00 |
| S03 | 0.00 | 0.00 | 0.00 | 0.00 | 0.00 | 0.00 | −0.02 | 0.00 |
| S04 | 0.02 | 0.00 | 0.00 | 0.00 | 0.02 | 0.00 | 0.00 | 0.00 |
| S05 | 0.03 | 0.00 | 0.00 | 0.00 | 0.03 | 0.00 | 0.02 | 0.00 |
| S06 | 0.05 | 0.00 | 0.00 | 0.00 | 0.05 | 0.00 | 0.01 | 0.00 |
| S08 | 0.02 | 0.00 | 0.00 | 0.00 | 0.02 | 0.00 | −0.02 | 0.00 |
| Average | 0.02 | 0.00 | 0.00 | 0.00 | 0.02 | 0.00 | 0.00 | 0.00 |

Embodiment according to the present invention not only reduces the required processing for the depth-to-DV conversion, but also reduces the number of memory accesses. According to the conventional approach, the depth-to-DV conversion for Inter mode is performed for each sub-blocks of the macroblock. Therefore, when the macroblock is divided into smaller sub-blocks, more memory accesses are needed. Table 2 illustrates the comparison of memory accesses between a system based on the present invention and an anchor system based on 3D-AVC. As shown in Table 2, the number of memory accesses is always 4 (corresponding to accessing 4 depth samples in the macroblock). On the other hand, the number of memory access is 64 for 4×4 sub-blocks and 16 for 8×8 sub-blocks in the case of 3D-AVC.

TABLE 2

| | Number of memory access Motion Partition | | | |
|---|---|---|---|---|
| | MV Prediction sub-block size | | | |
| | 4 × 4 | 8 × 8 | 16 × 16 | Skip/Direct |
| Anchor system | 64 | 16 | 4 | 4 |
| System using a single converted DV | 4 | 4 | 4 | 4 |

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video coding, the method comprising:
   receiving input data associated with a conversion region of a current picture in a current dependent view, wherein the conversion region comprises a grid of pixels;
   receiving depth data for the grid of pixels associated with the conversion region;
   determining the conversion region is partitioned into multiple motion prediction sub-blocks;
   determining a single converted DV (disparity vector) from the depth data associated with the conversion region based on at least (a) first depth data associated with a first motion prediction sub-block from the multiple motion prediction sub-blocks, and (b) second depth data associated with a second motion prediction sub-block from the multiple motion prediction sub-blocks; and
   processing each of the multiple motion prediction sub-blocks of the conversion region using the single converted DV.

2. The method of claim 1, further comprising:
   receiving input data associated with a second conversion region of the current picture, wherein the second conversion region comprises a second grid of pixels;
   receiving second depth data for the second grid of pixels associated with the second conversion region;
   determining the second conversion region is not partitioned into multiple motion prediction sub-blocks; and
   processing the second conversion region using the single converted DV.

3. The method of claim 2, wherein:
   processing the second conversion region comprises performing motion vector prediction (MVP) in Inter mode, performing MVP in Skip or Direct mode, or both.

4. The method of claim 3, wherein the conversion region is a 16.times.16 macroblock (MB).

5. The method of claim 2, wherein:
   processing the second conversion region comprises performing motion vector prediction (MVP) in Inter or Merge mode, performing MVP in Skip mode, or both.

6. The method of claim 5, wherein the conversion region corresponds to a Coding Unit (CU), a Largest CU (LCU), a coding tree unit (CTU), or a Motion Estimation Region (MER), and wherein the motion prediction sub-block corresponds to a Prediction Unit (PU).

7. The method of claim 2, wherein: processing the second conversion region comprises performing one or more of motion vector prediction (MVP) candidate derivation in Inter mode, MVP candidate derivation in Skip mode, MVP candidate derivation in Direct mode, direction-separated motion vector predictor, priority based MVP candidate derivation in the Skip mode or the Direct mode, inter-view candidate derivation in Merge mode, the inter-view candidate derivation in the Skip mode, inter-view motion prediction, inter-view disparity prediction, block-based view synthesis prediction, and inter-view residual prediction.

8. The method of claim 1, wherein the single converted DV is determined from a maximum depth value of more than two samples in a depth block associated with the conversion region.

9. The method of claim 8, wherein the single converted DV is determined from the maximum depth value of more than two samples in the depth block associated with the conversion region.

10. An apparatus for three-dimensional or multi-view video coding, the apparatus comprising one or more electronic circuits, wherein said one or more electronic circuits are configured to:
    receive input data associated with a conversion region of a current picture in a current dependent view, wherein the conversion region comprises a grid of pixels;
    receive depth data for the grid of pixels associated with the conversion region;
    determine the conversion region is partitioned into multiple motion prediction sub-blocks;
    determine a single converted DV (disparity vector) from the depth data associated with the conversion region based on at least (a) first depth data associated with a first motion prediction sub-block from the multiple motion prediction sub-blocks, and (b) second depth data associated with a second motion prediction sub-block from the multiple motion prediction sub-blocks; and
    process each of the multiple motion prediction sub-blocks of the conversion region using the single converted DV.

11. The apparatus of claim 10, wherein said one or more electronic circuits are further configured to:
    receive input data associated with a second conversion region of the current picture, wherein the second conversion region comprises a second grid of pixels;
    receive second depth data for the second grid of pixels associated with the second conversion region;
    determine the second conversion region is not partitioned into multiple motion prediction sub-blocks; and
    process the second conversion region using the single converted DV.

12. The method of claim 1, wherein processing each of the multiple motion prediction sub-blocks of the conversion region using the single converted DV comprises performing motion vector prediction (MVP) in Inter mode.

13. The method of claim 1, wherein processing each of the multiple motion prediction sub-blocks of the conversion region using the single converted DV comprises performing motion vector prediction (MVP) in Inter or Merge mode.

14. The method of claim 1, wherein processing each of the multiple motion prediction sub-blocks of the conversion region using the single converted DV comprises performing one or more of motion vector prediction (MVP) candidate derivation in Inter mode, MVP candidate derivation in Skip mode, MVP candidate derivation in Direct mode, direction-separated motion vector predictor, priority based MVP candidate derivation in the Skip mode or the Direct mode, inter-view candidate derivation in Merge mode, the inter-view candidate derivation in the Skip mode, inter-view motion prediction, inter-view disparity prediction, block-based view synthesis prediction, and inter-view residual prediction.

15. The method of claim 1, wherein determining the single converted DV from the depth data associated with the conversion region comprises determining the single converted DV from depth data associated with more than two of the multiple motion prediction sub-blocks.

* * * * *